(12) United States Patent
Matsuoka et al.

(10) Patent No.: US 6,730,378 B2
(45) Date of Patent: May 4, 2004

(54) RESIN-MOLDED ARTICLE AND PROCESS FOR PRODUCING THE SAME

(75) Inventors: Hideo Matsuoka, Ichinomiya (JP); Mitsushige Hamaguchi, Nagoya (JP); Kazuhiko Kobayashi, Tokoname (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 10/099,387

(22) Filed: Mar. 15, 2002

(65) Prior Publication Data

US 2002/0177672 A1 Nov. 28, 2002

(30) Foreign Application Priority Data

Mar. 16, 2001 (JP) .......................................... 2001-075473

(51) Int. Cl.⁷ .......................... B29D 22/00; C08L 23/00; C08L 67/00; C08L 77/00; C08L 81/00
(52) U.S. Cl. ...................... 428/35.7; 428/36.8; 525/131; 525/132; 525/146; 525/148; 525/150; 525/153; 525/176; 525/177; 525/182; 525/183; 525/184; 525/189; 525/199; 525/933
(58) Field of Search ............................... 428/35.7, 36.8; 525/131, 132, 146, 148, 150, 153, 176, 177, 182, 183, 184, 189, 199, 933

(56) References Cited

U.S. PATENT DOCUMENTS

| | | |
|---|---|---|
| 4,410,482 A | 10/1983 | Subramanian |
| 5,114,765 A | 5/1992 | Inada et al. |
| 5,663,229 A | 9/1997 | Presenz et al. |
| 5,708,088 A | 1/1998 | Hert et al. |

FOREIGN PATENT DOCUMENTS

| | | | |
|---|---|---|---|
| GB | 1068974 | | 5/1967 |
| JP | 6-190980 | * | 7/1994 |

* cited by examiner

Primary Examiner—Patricia A. Short
(74) Attorney, Agent, or Firm—Piper Rudnick LLP

(57) ABSTRACT

In the resin-molded articles comprising polyolefin resins (a) and thermoplastic resins other than the polyolefin resins (b), when thickness is defined as one along a direction vertical to the surface of the article, as morphology observed under an electron microscope in the article, a portion where the polyolefin resin (a) forms a continuous phase (A), a portion where the resin other than the polyolefin resin (b) forms the continuous phase and the polyolefin resin (a) forms a discontinuous phase (B), and a portion where the polyolefin resin (a) forms the continuous phase (A) are successively observed in order from the surface toward the inside along the thickness direction, such molded articles having nature such as toughness and fabrication quality inherent to the polyolefin resins and improved appreciably in resistance to permeation of liquid chemicals and gases.

10 Claims, 2 Drawing Sheets

RESIN-MOLDED ARTICLE AND PROCESS FOR PRODUCING THE SAME

BACKGROUND OF THE INVENTION

1. Field of the Invention

The present invention relates to resin-molded articles excellent in resistance to permeation of gases and/or liquids. Particularly, the invention relates to the resin-molded articles made up of combinations of a polyolefin resin and a polyamide resin and having markedly excellent resistance to permeation and fabrication quality.

2. Description of the Related Art

Polyolefin resins such as polyethylene and polypropylene are widely used as most common plastics for many miscellaneous goods, playthings, mechanical parts, electrical and electronic parts, automobile components, and so forth. In recent years, however, resin products requiring barrier properties to gas (resistance to permeation of gas) are increasing for the purposes of safety, storage stability, and further prevention of contents from leaking to ensure prevention of environmental pollution. Among these, as for automotive fuel tanks the conversion of metallic tanks to plastic tanks has been intensively studied in view of lightness in weight, easy fabrication, freedom of design, and easy handling, etc. Furthermore, it has come to be recognized that prevention of container contents from leaking are of importance to ensure the safety, the storage stability, and the prevention of environmental pollution. As a result, development of materials having resistance to permeation has been demanded. However, polyolefin vessels from polyethylene or polypropylene, which are the most common plastic vessels, fail to have sufficient barrier properties to gasoline and special oils and are frequently limited in applications, and the improvement thereof is expected.

As a method to improve this it is proposed that a thermoplastic resin such as polyamide having high barrier properties is blended with the polyolefin resin to form an alloy. However, simple formation of the alloy fails to improve sufficiently the barrier properties and does not necessarily lead to substantial solution to the problem.

Furthermore, as a special method of alloy formation, a method for dispersing a resin having high barrier properties into the polyolefin resin in a layer state is proposed (e.g., Japanese Patent Publication Nos. 14695/1985 and 296331/1992) and contributes greatly to improvement in the barrier properties. However, the dispersion of the resin having high barrier properties in a layer state as disclosed therein is carried out by extrusion molding (the melt is further stretched after extruding) and has a disadvantage of limiting the shapes of products to sheets or tubes and having insufficient fabrication quality.

SUMMARY OF THE INVENTION

The invention, which has been carried out to improve the barrier properties of the polyolefin resins while utilizing the nature of the resins such as toughness and fabrication quality, aims at providing resin-molded articles having excellent barrier properties to liquid chemicals and gases.

The invention provides a resin-molded article comprising a polyolefin resin (a) and a thermoplastic resin other than the polyolefin resin (b), and when depth of the direction vertical to the surface of the molded article is defined as a thickness, as morphology observed under an electron microscope in the resin-molded article, a portion where the polyolefin resin (a) forms a continuous phase (A), a portion where the resin other than polyolefin resin (b) forms a continuous phase and the polyolefin resin (a) forms a discontinuous phase (B), and a portion where the polyolefin resin (a) forms a continuous phase (A) are successively observed in order from the one surface toward the other side in the thickness direction, and also a process for producing the resin-molded article by melt-molding a resin mixture comprising from 20 to 80 weight percent of the polyolefin resin (a) and from 80 to 20 weight percent of the thermoplastic resin other than polyolefin resin (b) wherein a melt viscosity ratio defined by the following formula (1) at a fabricating temperature is 0.5 or less at an arbitrary shear rate of 200 second$^{-1}$ or less and 0.8 or more at an arbitrary shear rate of 1000 second$^{-1}$ or more.

Melt Viscosity Ratio=[Melt Viscosity of Thermoplastic Resin Other Than Polyolefin Resin]/[Melt Viscosity of Polyolefin Resin]   (1)

DESCRIPTION OF THE REFERENCE NUMERALS

Figure 3:
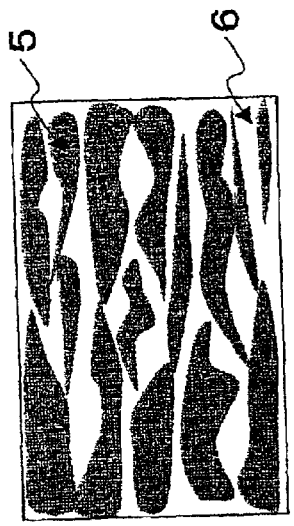
FIG. 3 is a schematic model showing phase structure (A-2) where both of the component of the polyolefin resin (a) and the component of the thermoplastic resin other than the polyolefin resin (b) form substantial continuous phases, respectively.

1: Component of thermoplastic resin other than polyolefin resin (b)
2: Component of polyolefin resin (a)
3: Component of polyolefin resin (a)
4: Component of thermoplastic resin other than polyolefin resin (b)
5: Component of thermoplastic resin other than polyolefin resin (b)
6: Component of polyolefin resin (a)
7: Position of gate
8: weld plane

DESCRIPTION OF THE PREFERRED EMBODIMENTS

Embodiments of the invention are illustrated below. In the invention, "weight" means "mass."

The polyolefin resins (a) used in the invention are thermoplastic resins prepared by polymerizing or copolymerizing olefins such as ethylene, propylene, butene, isoprene, and pentene. Examples of the polyolefin resins include homopolymers such as polyethylene, polypropylene, polystyrene, polyacrylic esters, polymethacrylic esters, poly-1-butene, poly-1-pentene, and polymethylpentene, ethylene/α-olefin copolymers, vinylalcohol ester homopolymers, polymers prepared by hydrolyzing at least part of the vinylalcohol ester homopolymers, [polymers prepared by hydrolyzing at least part of copolymers of (ethylene and/or propylene) with vinylalcohol esters], [copolymers of (ethylene and/or propylene) with (unsaturated carboxylic acids and/or unsaturated carboxylic esters)], [copolymers prepared by metallic salt formation of at least part of carboxylic groups of copolymers of (ethylene and/or propylene) with (unsaturated carboxylic acids and/or unsaturated carboxylic esters)], and block copolymers of conjugated dienes with vinylaromatic hydrocarbons and hydrogenated products thereof.

Of these, preferred examples include polyethylene, polypropylene, ethylene/α-olefin copolymers, [copolymers of (ethylene and/or propylene) with (unsaturated carboxylic acids and/or unsaturated carboxylic esters)], [and copolymers prepared by forming metallic salts from at least part of carboxylic groups of copolymers of (ethylene and/or propylene) with (unsaturated carboxylic acids and/or unsaturated carboxylic esters)].

The ethylene/α-olefin copolymers meant herein are copolymers of ethylene with at least one or more of α-olefins having three to 20 carbon atoms. Examples of the α-olefins having three to 20 carbon atoms include propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicocene, 3-methyl-1-butene, 3-methyl-1-pentene, 3-ethyl-1-pentent, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 9-methyl-1-decene, 11-methyl-1-dodecene, 12-ethyl-1-tetradecene, and combinations of these a-olefins. Of the copolymers from these α-olefins, those from a-olefins having three to 12 carbon atoms are preferred in view of improving mechanical strength. In the copolymers from these α-olefins, the content of α-olefins preferably ranges from 1 to 30 mole percent, more preferably from 2 to 25 mole percent, and much more preferably from 3 to 20 mole percent.

At least one of non-conjugated dienes can be further copolymerized, which include 1,4-hexadiene, dicyclopentadiene, 2,5-norbornadiene, 5-ethylidene-norbornene, 5-ethyl-2,5-norbornadiene, and 5-(1'-propenyl)-2-norbornene.

The unsaturated carboxylic acids used in [the copolymers of (ethylene and/or propylene) with (unsaturated carboxylic acids and/or unsaturated carboxylic esters)] are either of acrylic acid and methacrylic acid, or mixtures of both acids. Examples of the unsaturated carboxylic esters include methyl esters, ethylesters, propyl esters, butyl esters, pentylesters, hexyl esters, heptyl esters, octyl esters, nonyl esters, and decyl esters of these unsaturated carboxylic acids, and mixtures of these esters. Particularly, copolymers of ethylene and methacrylic acid and copolymers of ethylene, methacrylic acid, and an acrylic ester are preferred.

Of these polyolefin resins, low-, medium-, and high-density polyethylenes, polypropylenes, and ethylene/α-olefin copolymers are preferable. Low-, medium-, and high-density polyethylenes are more preferable, and high-density polyethylene having a density of from 0.94 to 0.97 g/cm$^3$ is particularly preferable.

The melt flow rate (hereinafter abbreviated as "MFR", ASTM D 1238) of the polyolefin resins (a) of the invention preferably ranges from 0.01 to 70 g/10 min and more preferably from 0.03 to 60 g/10 min. The MFR less than 0.01 g/10 min results in bad flowability, and exceeding 70 g/10 min may unpreferably cause deterioration in impact strength depending upon the shapes of molded articles.

Processes for producing the polyolefin resins (a) used in the invention are not particularly limited. All processes including radical polymerization, coordination polymerization in the presence of Tiegler-Natta catalyst, anionic polymerization, and coordination polymerization in the presence of metallocene catalyst can be used.

In the invention the polyolefin resins (a), part or all of which are modified with at least one compound selected from unsaturated carboxylic acids or derivatives thereof, are preferably used. Use of such modified polyolefin resins brings about improvement in compatibility and improvement in controllability of morphology of the resulting resin compositions and as a result leads to the advantage of developing excellent barrier properties, which is one of preferred embodiments.

Examples of the unsaturated carboxylic acids or derivatives thereof used as modifiers include acrylic acid, methacrylic acid, maleic acid, fumaric acid, itaconic acid, crotonic acid, methylmaleic acid, methylfumaric acid, citraconic acid, glutaconic acid, and metallic salts of these carboxylic acids, methyl hydrogen maleate, methyl hydrogen itaconate, methyl acrylate, ethyl acrylate, butyl acrylate, 2-ethylhexyl acrylate, hydroxyethyl acrylate, methyl methacrylate, 2-ethylhexyl methacrylate, hydroxyethyl methacrylate, aminoethyl methacrylate, dimethyl maleate, dimethyl itaconate, maleic anhydride, itaconic anhydride, citraconic anhydride, endobicyclo-(2,2,1)-5-heptene-2,3-dicarboxylic acid, endobicylco-(2,2,1)-5-heptene-2,3-dicarboxylic anhydride, maleimide, N-ethylmaleimide, N-butylmaleimide, N-phenylmaleimide, glycidyl acrylate, glycidyl methacrylate, glycidyl itaconate, glycidyl citraconate, and 5-norbornene-2,3-dicarboxylic acid. Of these modifiers, unsaturated dicarboxylic acids and anhydrides thereof are preferred, and maleic acid and maleic anhydride are particularly preferred.

Methods for introducing these unsaturated carboxylic acids or derivatives thereof into the polyolefin resins are not particularly limited. A method of copolymerizing beforehand olefin compounds and the unsaturated carboxylic acids or the derivative compounds thereof which are principal components or a method of introducing the unsaturated carboxylic acids or the derivative compounds thereof into unmodified polyolefin resins by carrying out grafting treatment using radical initiators can be adopted. The content of the unsaturated carboxylic acids or the derivative compounds introduced preferably ranges from 0.001 to 40 mole percent and more preferably from 0.01 to 35 mole percent to the total olefin monomers in modified polyolefin.

The thermoplastic resins other than polyolefin resins (b) used in the invention can be appropriately selected according to purposes of use of the resin-molded articles. Examples of the resins include thermoplastic polyester resins, polysulfone resins, tetrafluorinated polyethylene resins, polyetherimide resins, polyamideimide resins, polyamide resins, polyimide resins, polycarbonate resins, polyethersulfone resins, polyetherketone resins, polythioetherketone resins, polyphenylene sulfide resins (hereinafter abbreviated as the "PPS resins"), polyether etherketone resins, thermoplastic polyurethane resins, ABS resins, polyamide elastomers, and polyester elastomers. These resins can be used as mixtures consisting of two or more thereof. Of these resins, the thermoplastic polyester resins, the polyamide resins, and the PPS resins are preferably used, and the polyamide resins are particularly preferably used. Furthermore, it is practically preferable to use these thermoplastic resins other than the polyolefin resins as mixtures according to requirements such as impact resistance, fabrication quality, barrier properties, and so forth as long as the effect of the invention is not deteriorated.

Preferred examples of the thermoplastic polyesters include polyesters prepared from dicarboxylic acids such as terephthalic acid and aliphatic diols and polyesters prepared from hydroxycarboxylic acid such as polylactic acid. Dicarboxylic acids other than terephthalic acid include aliphatic dicarboxylic acids having 2 to 20 carbon atoms such as azelaic acid, sebacic acid, adipic acid, and decanedicarboxylic acid, aromatic dicarboxylic acids such as isophthalic acid and naphthalenedicarboxylic acid, and alicyclic dicarboxylic acid such as cyclohexanedicarboxylic acid. These dicarboxylic acids can be used singly or as mixtures. Examples of the aliphatic diols include ethylene glycol, 1,2-propylene glycol, 1,3-propylene glycol, 1,4-butanediol, trimethylene glycol, 1,4-cyclohexanedimethanol, and hexamethylene glycol. Specific examples of the polyesters include polyethylene terephthalate, polypropylene terephthalate, polybutylene terephthalate, polyhexamethylene terephthalate, polycyclohexylenedimethylene terephthalate, polyethylene naphthalate, and polybutylene naphthalate. Of these polyesters, copolymerized polyesters are particularly preferably used, including polybutylene terephthalate having suitable mechanical strength or polyesters prepared from a 1,4-butanediol component and a dicarboxylic acid component comprising terephthalic acid accounting for 60 mole percent or more and preferably 70 mole percent or more of the total dicarboxylic acids and dodecanedicarboxylic acid and/or isophthalic acid as other dicarboxylic acids.

Although the polymerization degree of these thermoplastic polyester resins is not particularly limited, the intrinsic viscosity of polybutylene terephthalate and the aforesaid copolymerized polyesters that are preferably used ranges from 0.5 to 2.5 and particularly preferably from 0.8 to 2.0 in measurement in a 0.5 percent o-chlorophenol solution at 25° C. The intrinsic viscosity of polyethylene terephthalate preferably ranges from 0.54 to 1.5 and particularly preferably from 0.6 to 1.2 in measurement in a 0.5% of o-chlorophenol solution at 25° C.

Preferred polyamide resins are polyamides containing as principal components amino acids, lactams, or diamines and dicarboxylic acids. Typical examples of the principal components include amino acids such as 6-aminocaproic acid, 11-aminoundecanoic acid, 12-aminododecanoic acid, and p-aminomethylbenzoic acid, lactams such as ε-caprolactam and ω-laurolactam, aliphatic, alicyclic, and aromatic diamines such as tetramethylenediamine, hexamethylenediamine, 2-methylpentamethylenediamine, nonamethylenediamine, undecamethylenediamine, dodecamethylenediamine, 2,2,4-/2,4,4-trimethylhexamethylenediamine, 5-methyl-nonamethylenediamine, m-xylylenediamine, p-xylylenediamine, 1,3-bis(aminomethyl)cyclohexane, 1,4-bis(aminomethyl)-cyclohexane, 1-amino-3-aminomethyl-3,5,5-trimethyl-cyclohexane, bis(4-aminocyclohexyl) methane, bis(3-methyl-4-aminocyclohexyl)methane, 2,2-bis(4-aminocyclohexyl)-propane, bis(aminopropyl)piperadine, and aminoethyl-piperadine, and aliphatic, alicyclic, and aromatic dicarboxylic acids such as adipic acid, suberic acid, azelaic acid, sebacic acid, dodecanedicarboxylic acid, terephthalic acid, isophthalic acid, 2-chloroterephthalic acid, 2-methylterephthalic acid, 5-methylisophthalic acid, sodium 5-sulfoisophthalate, 2,6-naphthalenedicarboxylic acid, hexahydroterephthalic acid, and hexahydroisophthalic acid. In the invention, nylon homopolymers and copolymers derived from these starting materials can be used singly or as mixtures, respectively.

In the invention, particularly useful polyamide resins are those having melting points of 150° C. or more and excellent thermal resistance and strength. Examples of such polyamides include polycaproamide (nylon 6), polyhexamethylene adipamide (nylon 66), polytetramethylene adipamide (nylon 46), polyhexamethylene sebacamide (nylon 610), polyhexamethylene dodecamide (nylon 612), polyundecanamide (nylon 11), polydodecanamide (nylon 12), polycaproamide/polyhexamethylene adipamide copolymer (nylon 6/66), polycaproamide/polyhexamethylene terephthalamide copolymer (nylon 6/6T), polyhexamethylene adipamide/polyhexamethylene terephthalamide copolymer (nylon 66/6T), polyhexamethylene adipamide/polyhexamethylene isophthalamide copolymer (nylon 66/6I), polyhexamethylene terephthalamide/polyhexamethylene isophthalamide copolymer (nylon 6T/6I), polyhexamethylene terephthalamide/polydodecanamide copolymer (nylon 6T/12), polyhexamethylene adipamide/polyhexamethylene terephthalamide/polyhexamethylene isophthalamide copolymer (nylon 66/6T/6I), polyxylylene adipamide (nylon XD6), polyhexamethylene terephthalamide/poly-2-methylpentamethylene terephthalamide copolymer (nylon 6T/M5T), polynonamethylene terephthalamide (nylon 9T), and mixtures thereof.

Particularly preferred polyamide resins are copolymers containing hexamethylene terephthalamide units such as nylon 6, nylon 66, nylon 610, nylon 6/66 copolymer, nylon 6T/66 copolymer, nylon 6T/6I copolymer, nylon 6T/12, and nylon 6T/6 copolymer. Furthermore, these polyamide resins also can be practically appropriately used as mixtures depending upon requirements such as impact resistance, fabrication quality, and compatibility.

Although the polymerization degree of these polyamide resins are not particularly limited, the relative viscosity of the polyamide resins preferably ranges from 1.5 to 7.0 and particularly preferably from 2.0 to 6.0 in measurement in a sample concentration of 0.01 g/ml in 98 percent sulfuric acid at 25° C.

Furthermore, the polyamide resins of the invention can preferably contain copper compounds in order to improve long-term resistance to heat. Examples of the copper compounds include copper(I) chloride, copper(II) chloride, copper(I) bromide, copper(II) bromide, copper(I) iodide, copper(II) iodide, copper(II) sulfate, copper(II) nitrate, copper phosphate, copper(I) acetate, copper(II) acetate, copper (II) salicylate, copper(II) stearate, copper(II) benzoate, and complex compounds of these inorganic copper halides with xylylenediamine, 2-mercaptobenzimidazole, and benzimidazole. Among these, copper(I) compounds, particularly copper(I) halide compounds, are preferred, and copper(I) acetate and copper(I) iodide can be exemplified as particularly appropriate copper compounds. The content of the copper compounds preferably ranges from 0.01 to 2 weight parts and more preferably from 0.015 to 1 weight part to 100 weight parts of the polyamide resins. A too much content of the copper compounds causes the separation of metallic copper on melt molding, coloring reducing values of the resulting products. In the invention, joint use of alkali halides and the copper compounds is possible. Examples of the alkali halide compounds include lithium chloride, lithium bromide, lithium iodide, potassium chloride, potassium bromide, potassium iodide, sodium bromide, and sodium iodide. Potassium iodide and sodium iodide are particularly preferred.

Preferred PPS resins are polymers having repeating units as shown in the following structural formula (I):

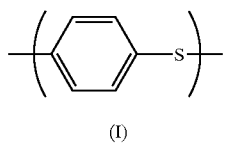

[Formula I]

(I)

Polymers containing 70 mole percent or more and further 90 mole percent or more of the repeating units as shown in this formula are preferred in view of resistance to heat. In the PPS resins, furthermore, repeated units less than about 30 mole percent of the PPS resins can be occupied by repeating units having the following structure:

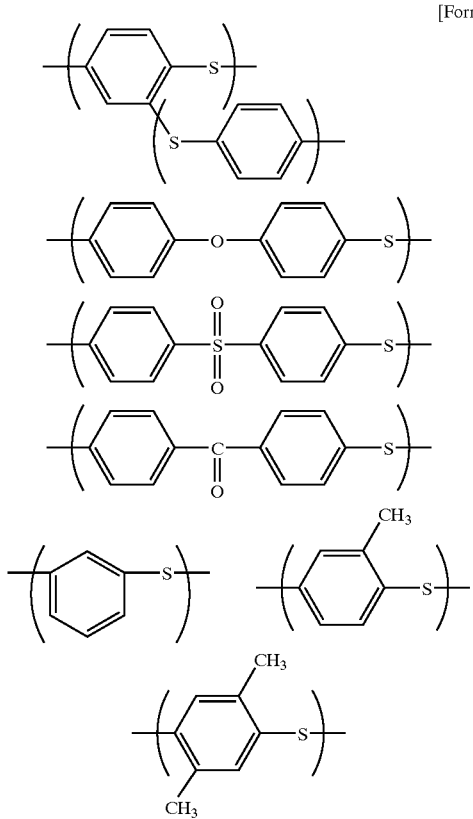

[Formula 2]

The melt viscosity of the PPS resins used in the invention is not particularly limited as long as melt kneading is possible. The PPS resins generally have a melt viscosity of from 5 to 2000 Pa·s and more preferably from 10 to 500 Pa·s (320° C., a shear rate of 1000 second$^{-1}$).

These PPS resins in general can be prepared according to known processes, that is, a process for producing polymers having relatively small molecular weight as disclosed in Japanese Patent Publication No. 3368/1970 or a process for producing polymers having relatively large molecular weight as described in Japanese Patent Publication Nos. 12240/1977 and 7332/1986. In the invention it is a matter of course that the PPS resins thus prepared can be used after undergoing a variety of treatments such as crosslinking/ higher molecular weight formation by heating the resins in the air, thermal treatment in an atmosphere of an inert gas such as nitrogen or under a reduced pressure, washing with organic solvent, hot water, or an aqueous solution of an acid, and activation by compounds containing functional groups such as acid anhydrides, amines, isocyanates, and functional group-containing disulfides.

As a specific method for carrying out the crosslinking/ higher molecular weight formation by heating the PPS resins, the resins are heated in a thermal vessel at a specified temperature in an atmosphere of an oxidizing gas such as the air or oxygen or in an atmosphere of a mixed gas containing the oxidizing gas and an inert gas such as nitrogen and argon until the desired melt viscosity is achieved. The temperature for the heat treatment in general is selected from the range of from 170 to 280° C. and preferably from 200 to 270° C. The time for the heat treatment in general is selected from the range of from 0.5 to 100 hr and preferably from 2 to 50 hr. The desired level of viscosity can be achieved by controlling both temperature and time. Heating apparatus for the procedure can be a common hot-air dryer, a rotary dryer, or a heating unit equipped with agitating blades. For efficient and uniform treatment, use of the rotary dryer or the heating unit equipped with agitating blades is preferred.

When the thermal treatment of the PPS resins is carried out in an atmosphere of an inert gas such as nitrogen or under a reduced pressure, as specific examples, the resins are heated at a temperature of from 150 to 280° C. and preferably from 200 to 270° C. for 0.5 to 100 hr and preferably for 2 to 50 hr. Heating apparatus for the procedure can be a common hot-air dryer, a rotary dryer, or a heating unit equipped with agitating blades. For efficient and uniform treatment, use of the rotary dryer or the heating unit equipped with agitating blades is more preferable.

The PPS resins used in the invention are preferably those having undergone deionization treatment. Specific methods for the deionization treatment include washing with an aqueous solution of an acid, washing with hot water, and washing with organic solvent. Combination of two or more washing treatments can be carried out.

The specific methods for washing the PPS resins with organic solvent are exemplified by the following methods. That is, organic solvents used for washing are not particularly limited as long as the solvents do not act so as to decompose the PPS resins. Examples of the organic solvents include nitrogen-containing polar solvents such as N-methyl-pyrrolidone, dimethylformamide, and dimethylacetoamide, sulfoxide- and sulfone-series solvents such as dimethyl sulfoxide and dimethyl sulfone, ketonic solvents such as acetone, methyl ethyl ketone, diethyl ketone, and acetophenone, ether-series solvents such as dimethyl ether, dipropyl ether, and tetrahydrofuran, halogen-series solvents such as chloroform, methylene chloride, trichloroethylene, dichlorinated ethylene, dichloroethane, tetrachloroethane, and chlorobenzene, alcoholic and phenolic solvents such as methanol, ethanol, propanol, butanol, pentanol, ethylene glycol, propylene glycol, phenol, cresol, and polyethylene glycol, and aromatic hydrocarbon-series solvents such as benzene, toluene, and xylene. Of these solvents, N-methyl pyrrolidone, acetone, dimethylformamide, and chloroform are preferably used. These organic solvents can be used singly or as mixtures of two or more thereof. Washing of the PPS resins with organic solvent can be carried out by immersing the resins in the organic solvents, and then stirring or heating also can be appropriately carried out as needed. The temperature of washing the PPS resins with the organic solvents is not particularly limited and an arbitrary temperature between ordinary temperature and 300° C. can be selected. As the temperature of washing increases, the efficiency of washing also tends to increase. However, the temperature from ordinary temperature to 150° C. in general offers sufficient efficiency of washing. The PPS resins washed with the organic solvents are preferably washed with water or warm water several times to remove the organic solvents left.

A specific method of washing the PPS resins with hot water is exemplified by the following method. Since the washing of the PPS resins with hot water produces an effect of preferred chemical modification, water used herein is preferably distilled water or deionized water. The operation of the treatment with hot water in general is carried out by adding a certain amount of the PPS resins in a certain amount of water and heating with stirring at ordinary pressure or in a pressure vessel. About the ratio of water to the PPS resins, use of a more amount of water is preferred. As a bath ratio, 200 g or less of the PPS resins in general is used to 1 liter of water.

Specific methods for washing the PPS resins with aqueous solutions of acids are exemplified by the following methods. That is, the PPS resins are immersed in acids or aqueous solutions of acids, and can be appropriately stirred or heated as needed. The acids used are not particularly limited as long as the acids have no activity to decompose the PPS resins. Examples of the acids include aliphatic saturated monocarboxylic acids such as formic acid, acetic acid, propionic acid, and butyric acid, halogen-substituted aliphatic saturated carboxylic acids such as chloroacetic acid and dichloroacetic acid, aliphatic unsaturated monocarboxylic acids such as acrylic acid and crotonic acid, aromatic carboxylic acids such as benzoic acid and salicylic acid, dicarboxylic acids such as oxalic acid, malonic acid, succinic acid, phthalic acid, and fumaric acid, and inorganic acidic compounds such as sulfuric acid, phosphoric acid, hydrochloric acid, carbonic acid, and silicic acid. Of these acids, acetic acid and hydrochloric acid are more preferably used. The PPS resins having undergone the acid treatment are preferably washed with water or warm water several times to remove acid or salt left. Water used for washing is preferably distilled water or deionized water, so that the effect of preferable chemical modification on the PPS resins caused by the acidic treatment is not deteriorated.

The contents of the polyolefin resins (a) and the thermoplastic resins other than the polyolefin resins (b) preferable for the resin-molded articles of the invention are from 20 to 80 weight percent of the polyolefin resins and from 80 to 20 weight percent of the thermoplastic resins other than the polyolefin resins, more preferably from 30 to 70 weight percent of the polyolefin resins and from 70 to 30 weight percent of the thermoplastic resins other than the polyolefin resins. Particularly preferably the contents are from 40 to 60 weight percent of the polyolefin resins and from 60 to 40 weight percent of the thermoplastic resins other than the polyolefin resins. When the content of the polyolefin resins (a) exceed 80 weight percent, the formation of the continuous phases of the thermoplastic resins other than the polyolefin resins that is one of characteristics of the resin-molded articles of the invention becomes difficult, failing to achieve the aim of the invention. The content less than 20 weight percent of the polyolefin resins (a) unpreferably results in reducing the toughness and adhesion of the resin-molded articles.

For the purpose of improving the compatibility of the polyolefin resins (a) with the thermoplastic resins other than the polyolefin resins (b), in the invention, the addition of known compatibillizing agents is permitted. Use of a modified polyolefin resin acting as the compatibillizing agent and as one of the polyolefin resins (a) results in improving compatibility because of nature of the polyolefin resins (a), and improving the adhesion to and compatibility with the resins other than the polyolefin resins (b) and the stability of the morphology of the resulting resin-molded articles to develop excellent impact resistance and permeation resistance. This is one of preferred embodiments.

Examples of the compatibillizing agents forming the polyolefin resins (a) include acid-modified polyolefins into which unsaturated dicarboxylic acid anhydrides are introduced through graft formation treatment by use of radical initiators, ethylene/unsaturated carboxylic acid copolymers, and epoxy group-containing olefinic copolymers containing as principal components glycidyl esters of $\alpha,\beta$-unsaturated acids. Two or more of these compatibillizing agents can be simultaneously used.

The unsaturated dicarboxylic acid anhydrides used for the acid-modified polyolefins include maleic anhydride, itaconic anhydride, and citraconic anhydride, and maleic anhydride is particularly suitable. The unsaturated carboxylic acids used for the ethylene/unsaturated carboxylic acid copolymers are either acrylic acid or methacrylic acid, or the mixture thereof. Esters of the unsaturated carboxylic acids can be partially contained.

The content of these compatibillizing agents preferably accounts for from 0.5 to 50 weight percent, more preferably from 1 to 40 weight percent, and most preferably from 1 to 30 weight percent of the polyolefin resins (a).

Other resins also can be contained as long as the aim of the invention is not deteriorated. In this case, formation of the morphology as described above is sufficiently achieved as long as the polyolefin resins (a) and the thermoplastic resins other than the olefin resins (b) satisfy the requirements of the invention.

The resin-molded articles of the invention are those having partially or totally the phase structure where the polyolefin resins form continuous phases (matrix) (A) and the phase structure where the thermoplastic resins other than the polyolefin resins form continuous phases (matrix) (B). The shape of the molded articles is not particularly limited. Furthermore, there are embodiments where the morphology (A) and (B) are separately formed and also embodiments where a plural number of the respective morphology (A) and (B) or either of the morphology (A) and (B) are formed. The morphology (A) and (B) are observed and confirmed under scanning and transmission electron microscopes.

Furthermore, the resin-molded articles of the invention are molded materials wherein the phase structure where the polyolefin resin forms a continuous phase (A) and the phase structure where the thermoplastic resin other than the polyolefin resin forms a continuous phase and the polyolefin resin forms discontinuous phases (B) are arranged in order of the phase structure (A), the phase structure (B) and the phase structure (A) in the thickness direction from one surface toward another surface, when thickness is defined as one along the direction vertical to the surface of the molded material.

Figure 1:
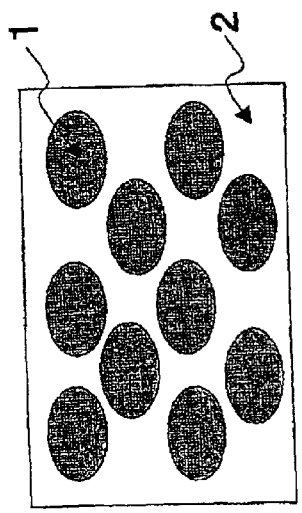
FIG. 1 is a schematic model showing phase structure (A-1) where a component of the polyolefin resin (a) forms a continuous phase and a component of the thermoplastic resin other than the polyolefin resin (b) forms a discontinuous phase.

A phase structure being characteristic of the resin-molded article of the invention where the polyolefin resin (a) forms a continuous phase (matrix) and the thermoplastic resin other than the polyolefin resin (b) forms a discontinuous phase (a-1) (FIG. 1) is observed and confirmed under scanning and transmission electron microscopes in an arbitrary depth of from 5 to 10 percent, preferably from 5 to 20 percent, and particularly preferably from 5 to 25 percent of the entire thickness from the surface, when thickness is defined as one along the direction vertical to the surface of the molded material. The phase structure formed on the surface portion of the molded article is particularly preferred because of excellent balance among the fabrication quality, the adhesion to other resins, and the toughness. In cases where the phase structure formed on the surface of a molded article is not observed in an arbitrary depth of 5 to 25 percent of the entire thickness from the surface, it becomes difficult to develop high adhesion and toughness that are characteristics of the resin-molded articles of the invention, no aim of the invention being achieved. On the other hand, the phase structure observed in an arbitrary depth exceeding 25 percent of the entire thickness from the surface unpreferably causes deterioration in barrier properties and mechanical strength of the resulting resin-molded articles.

Figure 2:
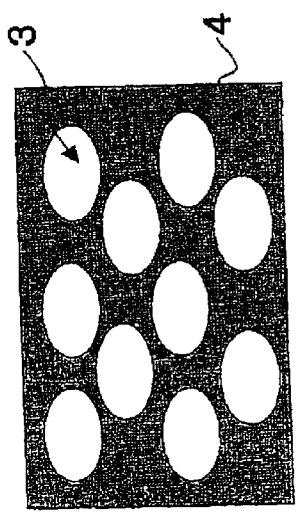
FIG. 2 is a schematic model showing phase structure (B) where a component of the thermoplastic resin other than the polyolefin resin (b) forms a continuous phase and a component of the polyolefin resin (a) forms a discontinuous phase.

A phase structure being characteristics of the invention where the thermoplastic resin other than the polyolefin resin (b) forms a continuous phase (matrix) and the polyolefin resin (a) forms a discontinuous phase (B) (FIG. 2) is observed and confirmed under scanning and transmission electron microscopes in an arbitrary depth of from 45 to 55 percent, preferably from 40 to 60 percent, and particularly preferably from 30 to 70 percent of the entire thickness from the surface, thickness being defined as one along the direction vertical to the surface of the molded material. The phase structure formed in the central portion of the molded article is particularly preferred because of excellent balance between the barrier properties and the mechanical strength. In cases where the phase structure formed in the central portion of the molded article is not observed in an arbitrary depth of from 30 to 70 percent of the entire thickness from the surface, development of high barrier properties that is characteristics of the resin-molded articles of the invention becomes difficult, no aim of the invention being achieved. Furthermore, the phase structure observed in an arbitrary depth outside the range of from 30 to 70 percent of the entire thickness from the surface unpreferably causes reduction in toughness and adhesion of the resin-molded article.

A phase structure being characteristics of the resin-molded article of the invention where both the polyolefin resins (a) and the thermoplastic resins other than the polyolefin resins (b) form continuous phases (co-continuous matrix) (A-2) (FIG. 3) is observed and confirmed under scanning and transmission electron microscopes in an arbitrary depth of from 5 to 10 percent, preferably from 5 to 20 percent, and particularly preferably from 5 to 25 percent of the entire thickness from the surface, thickness being defined as one along the direction vertical to the surface of the molded material. The phase structure formed on the surface portion of the molded article is particularly preferred because of excellent balance among the fabrication quality, the adhesion to other resins, and the toughness. When the phase structure formed on the surface portion of the molded article fails to be observed in an arbitrary depth of 5 to 25 percent of the entire thickness from the surface, development of high adhesion and toughness that are characteristics of the resin-molded articles of the invention becomes difficult, no aim of the invention being achieved. Furthermore, the phase structure observed in an arbitrary depth exceeding 25 percent of the entire thickness from the surface unpreferably causes reduction in barrier properties and mechanical strength of the resin-molded article.

The shape of the molded articles is not particularly limited. The discontinuous phases and the continuous phases formed by the polyolefin resins may appear plural times in various areas of the molded article in some cases. The phase structure is observed and confirmed under scanning and transmission electron microscopes.

The resin-molded articles of the invention can be prepared, for example, according to the following process. That is, the resin-molded articles of the invention in general can be formed by melt molding, and the melt molding however tends to produce differences in temperature and stress between the surface and the interior of the resin in fluidity. In the invention, this phenomenon is positively utilized. Resins different in dependence of melt viscosity on a shear rate are used as the polyolefin resin (a) and the thermoplastic resin other than the polyolefin resin (b), and according to the difference in the shear rate generated between the surface and the interior of the resins, on one side a portion where the polyolefin resin (a) forms the continuous phase is produced, and on the other side a portion where the thermoplastic resin other than the polyolefin resin (b) forms the continuous phase is produced, or a portion where both resins (a) and (b) form substantially continuous phases can be produced. In injection molding, for example, when the molding is carried out at a certain fabricating temperature, a melt viscosity ratio [Herein the melt viscosity ratio is defined as (melt viscosity of thermoplastic resin other than polyolefin resin)/(melt viscosity of polyolefin resin)] is adjusted to 0.5 or less at an arbitrary shear rate of about 200 second$^{-1}$ or less of the shear rate at the temperature and thereby, the thermoplastic resin other than the polyolefin resin forms the continuous phase. On the other hand, since the surface portion of a molded article inversely increases in the shear rate because of friction with the mold, the polyolefin resin can form the continuous phase in the surface portion when a combination of the resins has a melt viscosity ratio of 0.8 or more in an arbitrary shear rate of about 1000 second$^{-1}$ or more of the shear rate at the temperature.

As may be seen from this description, the gist of the above paragraph is to describe embodiments of the invention by making use of the dependence of the melt viscosity ratio on shear stress, but the invention is not limited by specific values of the melt viscosity ratio. Furthermore, the shear stress generated at an arbitrary position of a molded article can be controlled, for example, by the design of a mold and it can be understood with ease that such morphology can be produced in arbitrary positions. The invention is not limited also by methods of molding.

The resin-molded articles of the invention can contain inorganic fillers in order to impart mechanical strength, rigidity, and barrier properties thereto. Although materials for the fillers are not particularly limited, fibrous, tabular, powdery, and granular fillers can be used. Examples of the fillers include fibrous fillers such as glass fiber, carbon fiber, potassium titanate whisker, zinc oxide whisker, alumina fiber, silicon carbide fiber, ceramic fiber, asbestos fiber, plaster fiber, and metal fiber, silicate salts such as wollastonite, sericite, kaolin, mica, clay, bentonite, asbestos, talc, and alumina silicate, swelling laminar silicate salts such as montmorillonite and synthetic mica, metallic compounds such as alumina, silicon oxide, magnesium oxide, zirconium oxide, titanium oxide, andiron oxide, carbonate salts such as calcium carbonate, magnesium carbonate, and dolomite, sulfate salts such as calcium sulfate and barium sulfate, and non-fibrous fillers such as glass beads, ceramic beads, boron nitride, silicon carbide, calcium phosphate, and silica. These fillers can be hollow and furthermore, two or more of these fillers can be jointly used.

These inorganic fillers can be preliminarily treated with isocyanate compounds, organic silane compounds, organic titanate compounds, organic boran compounds, and coupling agents such as epoxy compounds, and the swelling laminar silicate salts can be treated with organic onium ions beforehand in order to acquire more excellent mechanical strength and barrier properties.

The content of these inorganic fillers preferably ranges from 0.1 to 200 weight parts, more preferably from 0.5 to 200 weight parts, and particularly preferably from 1 to 150 weight parts to 100 weight parts of the combined amount of the polyolefin resin (a) and the thermoplastic resin other than the polyolefin resin (b).

In order to impart electrical conductivity, the resin-molded articles of the invention can contain a conductive filler and/or a conductive polymer. Conductive materials are not particularly limited and used without limitation as long as the materials are commonly used as conductive fillers to impart the electrical conductivity to resins. Examples of the materials include metallic powders, metallic flakes, metallic ribbons, metal fibers, metal oxides, inorganic fillers covered with conductive substances, carbon powder, graphite, carbon fiber, carbon flake, and scaly carbon.

Specific examples of metals used as the metallic powders, metallic flakes, and metallic ribbons include silver, nickel, copper, zinc, aluminum, stainless, iron, brass, chromium, and tin.

Specific examples of metals used as the metal fibers include iron, copper, stainless, aluminum, and brass.

Such metallic powders, metallic flakes, metallic ribbons, and metal fibers can be treated with titanate-, alumina-, and silane-series surface treatments.

Examples of the metal oxides include $SnO_2$ (antimony dope), $In_2O_3$ (antimony dope), and ZnO (aluminum dope). These metal oxides can be subjected to surface treatment with titanate-series, aluminum-series, and silane-series coupling agents.

Examples of the electrically conductive substances with which the inorganic fillers are covered include aluminum, nickel, silver, carbon, $SnO_2$ (antimony dope), and $In_2O_3$ (antimony dope). The inorganic fillers to be covered are exemplified by mica, glass beads, glass fiber, carbon fiber, potassium titanate whisker, barium sulfate, zinc oxide, titanium oxide, aluminum borate whisker, zinc oxide-series whiskers, titanium oxide-series whisker, and silicon carbide whisker. Methods of the covering include vacuum deposition, spattering, electroless plating, and baking. These can be subjected to surface treatment with titanate-series, aluminum-series, or silane-series coupling agents.

The carbon powders are classified into acetylene black, gas black, oil black, naphthalene black, thermal black, furnace black, lamp black, channel black, roll black, and disk black according to the starting materials and the processes for production. The carbon powders usable in the invention are not particularly limited by the starting materials and the processes for production. However, use of acetylene black and furnace black are particularly preferred. A variety of carbon powders different in characteristics such as particle size, surface area, oil absorption (DBP), and ash content are produced. The carbon powders usable in the invention are not particularly limited by these characteristics, but the average particle size is preferably 500 nm or less, more preferably from 5 to 100 nm, and particularly preferably from 10 to 70 nm in view of balance between the strength and the electrical conductivity. The specific surface area (BET method) is preferably 10 $m^2$/g or more and further preferably 30 $m^2$/g or more. The oil absorption (DBP) is preferably 50 ml/100 g or more and particularly preferably 100 ml/100 g or more. The ash content is preferably 0.5 weight percent or less and particularly preferably 0.3 weight percent or less.

These carbon powders can be treated with titanate-series, aluminum-series, silane-series surface treatments. Carbon powders granulated also can be used in order to improve the operating properties in melt kneading.

The molded materials prepared by processing the resin-molded article compositions of the invention are frequently expected to have smooth surfaces. It is preferable from this viewpoint that similarly to the inorganic fillers (c), the conductive fillers used in the invention have any form of powder, particle, plate, scale, or fiber having a length/diameter ratio of 200 or less rather than fibrous fillers having high aspect ratios.

Examples of the conductive polymers include polyaniline, polypyrrole, polyacetylene, poly(p-phenylene), polythiophene, and polyphenylenevinylene.

The conductive fillers and/or the conductive polymers can be used as mixtures of two or more thereof. Of these conductive fillers and conductive polymers, carbon black can be most preferably used in view of strength and economy.

The content of the conductive fillers and/or the conductive polymers used in the invention varies depending upon kinds of fillers and/or polymers used and cannot be unqualifiedly stipulated. However, the content is selected within the range of from 1 to 250 weight parts and preferably from 3 to 100 weight parts of the combined weight of the resins (a) and (b) in view of balance among the electrically conductivity, the fluidity, and the mechanical strength. Further preferably, the content is selected within the range of from 3 to 100 weight parts to 100 weight parts of the combined weight of the resins (a) and (b) in order to impart the conductive function.

When the electrical conductivity is imparted, the volume specific resistance is preferably $10^{10}$ Ω·cm or less in order to acquire sufficient antistatic capability. Herein, blending of the aforesaid conductive fillers and the conductive polymers in general tends to bring about deterioration in strength and fluidity. Therefore, as long as a desired level of conductivity is ensured, the content of the conductive fillers and the conductive polymers is desired to be as small as possible. Although the desired level of conductivity differs depending upon the purposes, the volume specific resistance in general ranges from 100 Ω·cm to $10^{10}$ Ω·cm.

Other components can be added to the compositions of the invention as long as the effect of the invention is not deteriorated. Examples of the other components include antioxidants, stabilizers to heat (hindered phenol-series, hydroquinone-series, phosphite-series stabilizers, and substituted derivatives thereof), weathering agents (resorcinol-series, salicylate-series, benzotriazole-series, benzophenone-series, and hindered amine-series agents), release agents and lubricants (montanic acid and metal salts, esters, and half-esters thereof, stearyl alcohol, stearamides, various bisamides, bisurea, and polyethylene wax), pigments (cadmium sulfide, phthalocyanine, and carbon black), dyes (Nigrosine), nucleating agents (talc, silica, kaolin, and clay), plasticizers (octyl p-oxybenzoate and N-butylbenzenesulfonamide), antistatic agents (alkylsulfate-type anionic antistatic agents, quaternary ammonium salt-type cationic antistatic agents, nonionic antistatic agents such as polyoxyethylene sorbitan monostearate, and betaine-type amphoteric antistatic agents), flame retardants (e.g., red phosphorus, melamine cyanurate, hydroxides such as magnesium hydroxide and aluminum hydroxide, ammonium polyphosphate, brominated polystyrene, brominated polyphenylene ether, brominated polycarbonate, brominated epoxy resins, and combinations of these bromine-series flame retardants and antimony trioxide), and other polymers.

Processes for preparing the resin-molded articles of the invention are not particularly limited as long as the formation of the morphology required by the invention can be achieved. In order to realize the preferred morphology, for example, in melt kneading carried out with a biaxial extruder, the polyolefin resins (a) and the thermoplastic resins other than the polyolefin resins (b) are supplied from the main feeder, and the inorganic fillers are supplied from the side feeder in the tip portion of the extruder. Or the polyolefin resins (a) and the thermoplastic resins other than the polyolefin resins (b) are melt kneaded beforehand, and subsequently further melt kneaded with the inorganic fillers.

For the resin-molded articles of the invention, there are embodiments to produce a variety of shapes. In order to obtain melted molded products, particularly, known methods (injection molding, extrusion molding, blow molding, and press molding) can be adopted. However, use of a method selected from injection molding, injection compression molding, and compression molding preferably achieves the aim of the invention with ease. The molding temperature in general is selected in the range of temperature from 5 to 50° C. higher than melting points of the thermoplastic resins other than the polyolefin resins. In general single-layer formation is carried out, but multi-layer structures also can be formed through two-color injection molding or co-extrusion molding.

The multi-layer structures herein mean those having at least a single layer made of the resin-molded component of the invention therein. Arrangement of the respective layers is not particularly limited. All layers can be made of the resin-molded articles of the invention, or other layers can be made of other thermoplastic resins.

These multi-layer structures can be produced by the two-color injection molding and so forth. Formation of film or sheet structures can be carried out by melting in different extruders the respective compositions forming the layers, supplying into a die for multi-layer structures and then performing co-extrusion molding, or by forming the other layers beforehand, and then melt-extruding the resin-molded article layer of the invention according to the so-called laminate molding method. When the laminated structures are hollow vessels such as bottles, barrels, and tanks or tubular products such as pipes and tubes, common co-extrusion molding can be adopted. For example, in a two-layer hollow molded article where the inner layer is formed of the resin-molded component of the invention and the outer layer is formed of another resin, the resin-molded article composition of the invention and another resin composition are supplied separately into two extruders, and the two melted resins are supplied into a common die under pressure so that the respective annular streams are formed and the resin-molded component layer as the inner layer and another resin layer as the outer layer are allowed to flow together and subsequently co-extruded outside the die, and known tube molding or blow molding is carried out, thus to form a two-layer hollow molded article. For a three-layer hollow molded article, a three-layer structure can be achieved by a method similar to the above by three extruders, or a hollow molded article of two-kind three-layer structures can be prepared by use of two extruders. In these methods, co-extrusion molding is preferably carried out in view of the adhesion between the two layers.

The thermoplastic resins used for the other layers include saturated polyesters, polysulfones, tetrafluorinated polyethylene, polyether imides, polyamide imides, polyamides, polyketone copolymers, polyphenylene ethers, polyimides, polyether sulfones, polyether ketones, polythio-ether ketones, polyether ether ketones, thermoplastic polyurethanes, polyolefins, ABS, polyamide elastomers, and polyester elastomers. These resins also can be used as mixtures thereof or after adding various additives.

The resin-molded articles of the invention can be preferably used as transport and storage vessels for liquid chemicals and/or gases and attached parts thereof because of barrier properties, the durability, and fabrication quality. Examples of the liquid chemicals and the gases include Flon-11, Flon-12, Flon-21, Flon-22, Flon-113, Flon-114, Flon-115, Flon-134a, Flon-32, Flon-123, Flon-124, Flon-125, Flon-143a, Flon-141b, Flon-142b, Flon-225, Flon-C318, R-502, 1,1,1-trichloroethane, methyl chloride, methylene chloride, ethyl chloride, methylchloroform, propane, isobutane, n-butane, dimethyl ether, castor-based brake fluids, glycol ether-series brake fluids, borate ester-series brake fluids, brake fluids for severe cold regions, silicone oil-series brake fluids, mineral oil-series brake fluids, power steering oil, window-washer fluids, long-life coolants, gasoline, methanol, ethanol, isobutanol, butanol, nitrogen, oxygen, Hydrogen, carbon dioxide, methane, propane, natural gas, argon, helium, xenon, and pharmaceuticals. The resin-molded articles of the invention have excellent resistance to permeation of these gases and/or liquids or vaporized gases and therefore, in addition to use as films having resistance to permeation of the aforesaid gases and/or liquids, can be used for bottles for various chemicals such as air bag, shampoo, rinse, liquid soap, and detergent, tanks as automobile components, parts for medical instrument, and parts for general living instrument such as tanks for storage of liquid pharmaceuticals, tanks for storage of gases, tanks for coolants, tanks for transferring oils, tanks for disinfectants, tanks for transfusion pumps, fuel tanks, canisters, washer liquid tanks, and oil reservoir tanks, bottle-form molded articles and tanks thereof, valves and joints such as cut-off valve covers and ORVR valve covers attached to bottles, parts such as gauges and cases of attaching pumps, various connecting parts of fuel tubes (connectors, etc.) such as fuel filler under pipes, ORVR hoses, reserve hoses, and bent hoses, connecting parts of oil tubes, connecting parts of brake hoses, nozzles of window-washer liquids, connecting parts of cooler hoses of coolants and refrigeration mediums, connecting parts of tubes of air-conditioner refrigeration mediums, connecting parts of floor heating pipes, hoses of fire-extinguishers and extinguishing units, connecting parts and valves of tubes for medical coolers, application to tubes for transporting chemical liquids and gases, application to chemical storage vessels requiring resistance to permeation of liquid chemicals and gases, automobile components, application to internal combustion engines, and a variety of application to electrical and electronic parts, medical services, food, parts for household and offices, parts for building materials, and parts for furniture as well as mechanical parts such as electric tool housings.

EXAMPLES

The invention is illustrated below through examples in detail, but the essence of the invention cannot be limited only by the following examples.

(1) Permeability to Alcohol-Gasoline

A tube of an 8-mm outer diameter and a 6-mm inner diameter was molded by use of an extruder of 40-mm diameter consisting of a die forming a tube at the tip thereof, a sizing die for cooling the tube and controlling size, and a take-off gear. The tube was cut into 20-cm length, and one end thereof was closely sealed. 6 g of an alcohol-gasoline mixture were precisely weighed and placed in the tube, and the other end thereof also was closely sealed, alcohol/ gasoline mixture which consists of model gasoline (toluene/isooctane=50/50 in volume percent) and ethanol in weight ratio of 90:10. Subsequently, the total test tube was weighed, allowed to stand in a 40° C. explosion-proof oven for 500 hr, and then weighed again to find loss in weight.

(2) Absorption of Alcohol-Gasoline

An ASTM first tensile specimen (thickness: 1/8 inch) prepared by injection molding was immersed in the alcohol-gasoline mixture consisting of the model gasoline and ethanol in weight ratio of 90:10 in an autoclave and allowed to stand in a 40° C. explosion-proof oven for 24 hr. The liquid absorption was thus found as a weight increase ratio from the weight on absolutely drying just after molding and the weight after absorbing the alcohol-gasoline mixture.

Liquid Absorption (%)={[(Weight after Absorbing Liquid)−(Weight on Absolutely Drying)]/(Weight on Absolutely Drying)}×100

(3) Water Absorption

An ASTM first tensile specimen (thickness: 1/8 inch) prepared by injection molding was allowed to stand in an air-conditioning oven at 60° C.-95% RH for 24 hr. The water absorption was found as a weight increase ratio from the weight on absolutely drying just after molding and the weight after absorbing water.

Water Absorption (%)={[(Weight after Absorbing Water−Weight on Absolutely Drying)]/(Weight on Absolutely Drying)}×100

(4) Hot Welding Properties

Figure 4:
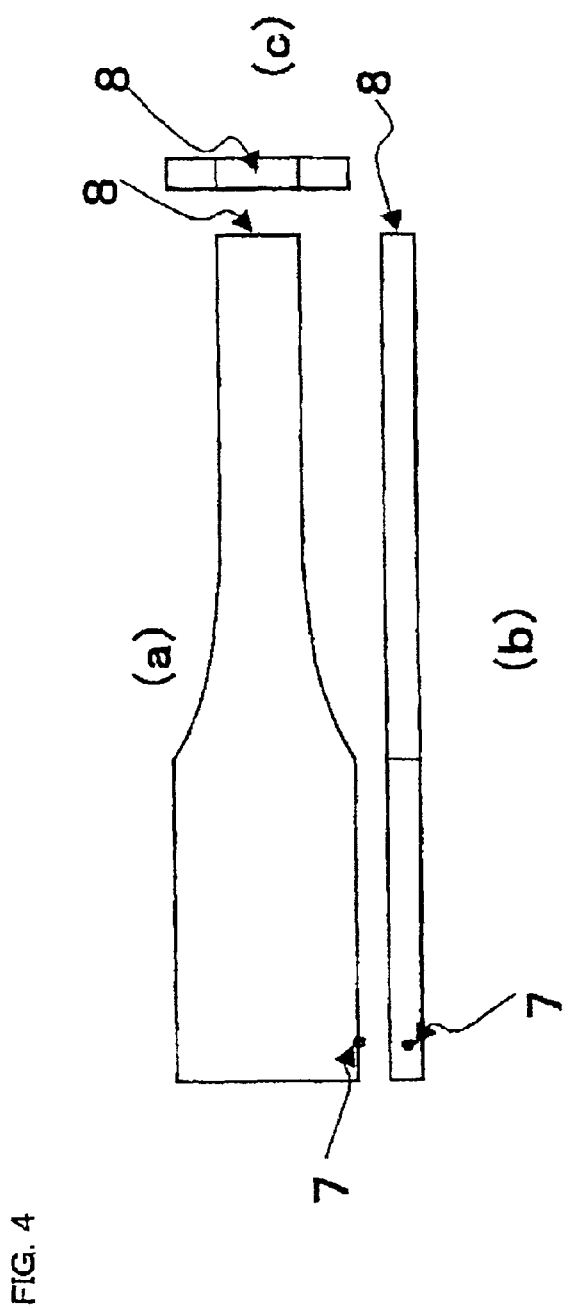
FIG. 4 shows three views of a test specimen for evaluating hot welding properties: (a) shows a plan view, (b) shows a front view, and (c) shows a side view.

An ASTM first tensile specimen that became ½ size in the long direction was prepared by injection molding (FIG. 4). The weld surface of the specimen was melted on a hot plate heated at 300° C. for 30 seconds, hot plate on which a Teflon sheet had been spread. Subsequently, an HDPE specimen (manufactured by Mitsui Chemicals, Inc. "HIZEX" 8200B) was prepared similarly, and the weld surface thereof was melted. The melt surfaces of both specimens were allowed to adhere. Tensile characteristics of the resulting specimen were measured according to ASTM D638.

(5) Strength of Materials

Measurements were carried out according to the following standard methods.

Tensile Strength: ASTM D638

Izod Impact Strength: ASTM D256

(6) Observation of Morphology

A portion of from 0.1 to 0.3 mm (surface portion) and A portion of from 1.4 to 1.8 mm (central portion) from the surface in the thickness direction of the ASTM first test specimen were observed under electron microscopes (TEM, SEM).

(7) Melt Viscosity Ratio

The melt viscosity (Pa·s) at 100 sec$^{-1}$ and 5,000 sec$^{-1}$ of shear rates at the kneading temperature was measured by use of a plunger-type capillary rheometer (produced by Toyo Seiki Seisakusho K. K., CAPILOGRAPH TYPE 1C), and the melt viscosity ratio was calculated according to the following formula (1).

Melt Viscosity Ratio=[Melt Viscosity of Thermoplastic Resin other than Polyolefin Resin]/[Melt Viscosity of Polyolefin Resin]     (1)

Reference Example 1

(Preparation of Organically-Modified Layered Silicate)

100 g of Na-type montmorillonite (Kunimine Kogyo K.K. KUNIPIA F, cation exchange capacity: 120 milli-equivalent/100 g) were dispersed with stirring in 10 liters of warm water, and 48 g of trioctylmethylammonium chloride (1 equivalent to the cation exchange capacity) dissolved in 2 liters of warm water were added thereto with stirring for 1 hr. A precipitate produced was filtered off and washed with warm water. This washing and filtration were repeated three times, the resulting solid was dried under vacuum at 80° C. to obtain a organically-modified Layered Silicate. The ash content of the resulting layered silicate was determined and found to be 67 weight percent. The determination of the ash content was carried out by ashing 0.1 g of the layered silicate in a 500° C. electric furnace for 3 hr and weighing the layered silicate before and after ashing.

The polyolefin resins and the thermoplastic resins other than the polyolefin resins used in examples and comparative examples are as follows. Polymerization was carried out according to ordinary procedures in all cases unless otherwise noted.

Polyolefin Resins: PO

PO-1: High-density polyethylene having a MFR of 0.04 g/10 min and a density of 0.956.

PO-2: High-density polyethylene having a MFR of 6 g/10 min and a density of 0.956.

PO-3: Modified polyethylene prepared by mixing 100 weight parts of a high-density polyethylene having a MFR of 6 g/10 min and a density of 0.956, 1 weight part of maleic anhydride, and 0.1 weight part of 2,5-dimethyl-2,5-di(tert-butylperoxy)hexane and melt extruding the mixture from a biaxial extruder at a cylinder temperature of 230° C.

PO-4: Modified polyethylene prepared by mixing 100 weight parts of a high-density polyethylene having a MFR of 0.36 g/10 min and a density of 0.958, 1 weight part of maleic anhydride, and 0.1 weight part of 2,5-dimethyl-2,5-di(tert-butylperoxy)hexane and melt extruding from a biaxial extruder at a cylinder temperature of 230° C.

PO-5: Ethylene/glycidyl methacrylate (=94/6 in weight ratio) copolymer. The MFR: 3 g/10 min.

Thermoplastic Resins other than the Polyolefin Resins:

PA-1: Nylon 6 resin having a melting point of 225° C. and a relative viscosity of 2.35.

PA-2: Nylon 6 resin having a melting point of 225° C. and a relative viscosity of 2.75.

PA-3: Nylon 6 resin having a melting point of 225° C. and a relative viscosity of 4.40.

PA-4: Nylon 6 resin containing layered silicate that is prepared by mixing 5 weight parts of the organically-modified Layered Silicate obtained in the aforesaid Reference Example 1 with 100 weight parts of a nylon 6 resin having a melting point of 225° C. and a relative viscosity of 2.35 and melt extruding the mixture from a biaxial extruder at a cylinder temperature of 250° C.

PPS: PPS resin having a melting point of 280° C., a MFR of 100 g/10 min (315° C., a load of 5,000 g), a Mw of 70,000, and a melt viscosity of 170 Pa·s (320° C., a shear rate of 1000 sec$^{-1}$).

PBT: Polybutylene terephthalate resin having a melting point of 224° C. and an intrinsic viscosity of 0.89 (o-chlorophenol, 25° C.).

Examples 1 to 7 and Comparative Examples 1 to 4

As shown in Table 1, the polyolefin resins and the thermoplastic resins other than the polyolefin resins were supplied from the main feeder of a TEX-30 type biaxial extruder produced by The Japan Steel Works, Ltd. and melt kneaded at a temperature of from 250 to 300° C. and a screw rotation speed of 200 rpm. The resulting pellets were dried and then specimens were prepared by injection molding (IS100FA produced by Toshiba Machine Co., Ltd., cylinder temperature: 250 to 300° C., die temperature: 80° C.). The barrier properties, the hot welding properties, and the strength of materials were determined as to the respective specimens. Results are shown in Table 1.

Results of Examples 1 to 7 and Comparative Examples 1 to 4 as shown in Table 1 reveal that the resin-molded articles of the invention having particular morphology stimulated have excellent advantages in barrier properties and welding properties to have high practical value.

TABLE 1

| Item | | Unit | Example 1 | Example 2 | Example 3 | Example 4 | Example 5 | Example 6 | Example 7 |
|---|---|---|---|---|---|---|---|---|---|
| Composition | Polyolefin Resin | — | PO-1 | PO-1 | PO-1 | PO-1 | PO-1 | PO-1 | PO-1 |
| | Content | wt % | 25 | 35 | 20 | 35 | 25 | 55 | 45 |
| | Modified Polyolefin Resin | — | PO-3 | PO-3 | PO-3 | PO-3 | PO-3 | PO-5 | PO-5 |
| | Content | wt % | 25 | 25 | 20 | 10 | 25 | 5 | 10 |
| | Thermoplastic Resin | — | PA-1 | PA-1 | PA-2 | PA-2 | PA-4 | PPS | PBT |
| | Content | wt % | 50 | 40 | 60 | 55 | 50 | 40 | 45 |
| | Kneading Temperature | ° C. | 250 | 250 | 250 | 250 | 250 | 300 | 250 |
| Melt Viscosity Ratio | Low Shear Rate: 100 second$^{-1}$ | | 0.12 | 0.11 | 0.26 | 0.27 | 0.19 | 0.25 | 0.35 |
| | High Shear Rate: 5,000 second$^{-1}$ | | 1.00 | 0.90 | 0.85 | 1.22 | 1.00 | 1.10 | 0.82 |
| morphology | Surface Portion | | PO matrix | PO matrix | PO, PA matrix | PO, PA matrix | PO matrix | PO matrix | PO matrix |
| | Central Portion | | PA matrix | PA matrix | PA matrix | PA matrix | PA matrix | PPS matrix | PBT matrix |
| Barrier Properties | Alcohol/Gasoline Permeation | g | 0.4 | 0.8 | 0.3 | 0.6 | 0.2 | <0.1 | 0.2 |
| | Alcohol/Gasoline Absorption Rate | % | 0.8 | 1.3 | 0.7 | 1.1 | 0.6 | 0.9 | 0.6 |
| Water Absorption | Water Absorption | % | 1.2 | 0.7 | 1.4 | 0.9 | 1.1 | <0.1 | 1.1 |
| Hot Welding Properties (Toward HDPE) | Tensile Strength | MPa | 80 | 85 | 75 | 80 | 82 | 70 | 75 |
| | Tensile Elongation | % | 4.5 | 5.5 | 4.0 | 4.5 | 3.5 | 3.0 | 3.5 |
| Physical Properties of Material | Tensile Strength | MPa | 39 | 35 | 44 | 36 | 42 | 36 | 35 |
| | Izod Impact Strength | J/m | 750 | 800 | 700 | 800 | 150 | 150 | 30 |

| Item | | Unit | Comparative Example 1 | Comparative Example 2 | Comparative Example 3 | Comparative Example 4 |
|---|---|---|---|---|---|---|
| Composition | Polyolefin Resin | — | PO-1 | — | PO-2 | PO-1 |
| | Content | wt % | 100 | | 25 | 25 |
| | Modified Polyolefin Resin | — | — | — | PO-3 | PO-4 |
| | Content | wt % | | | 25 | 25 |
| | Thermoplastic Resin | — | — | PA-2 | PA-3 | PA-1 |
| | Content | wt % | | 100 | 50 | 50 |
| | Kneading Temperature | ° C. | 250 | 250 | 250 | 250 |
| Melt Viscosity Ratio | Low Shear Rate: 100 second$^{-1}$ | | — | — | 3.80 | 0.04 |
| | High Shear Rate: 5000 second$^{-1}$ | | — | — | 4.00 | 0.45 |
| morphology | Surface Portion | | — | — | PO matrix | PA matrix |
| | Central Portion | | — | — | PO matrix | PA matrix |
| Barrier Properties | Alcohol/Gasoline Permeation | g | 3.1 | <0.1 | 1.8 | 0.4 |
| | Alcohol/Gasoline Absorption Rate | % | 4.8 | 0.5 | 2.5 | 0.7 |
| Water Absorption | Water Absorption | % | <0.1 | 3.8 | 0.7 | 1.8 |
| Hot Welding Properties (Toward HDPE) | Tensile Strength | MPa | 85 | not weld | 85 | 20 |
| | Tensile Elongation | % | >20 | | 5.5 | 0.8 |
| Physical Properties of Material | Tensile Strength | MPa | 28 | 78 | 35 | 38 |
| | Izod Impact Strength | J/m | N.B. | 60 | 200 | 340 |

PO-1: High-density polyethylene (MFR = 0.04, Density 0.956)
PO-2: High-density polyethylene (MFR = 6, Density 0.956)
PO-3: Acid-modified product of high-density polyethylene (MFR = 6, Density 0.956)
PO-4: Acid-modified product of high-density polyethylene (MFR = 0.36, Density 0.958)
PO-5: Ethylene/glycidyl methacrylate copolymer
PA-1: Nylon 6 (Mp 225° C., Relative Viscosity 2.35)
PA-2: Nylon 6 (Mp 225° C., Relative Viscosity 2.75)
PA-3: Nylon 6 (Mp 225° C., Relative Viscosity 4.40)
PA-4: Nylon 6 containing silicate salt in layer form
PPS: PPS (Mp 280° C., MFR = 100)
PBT: PBT (Mp 224° C., Intrinsic Viscosity 0.89)

What is claimed is:

1. A resin-molded article comprising a polyolefin resin (a) and a thermoplastic resin other than the polyolefin resin (b) having a morphology observed under an electron microscope in the resin-molded article in a thickness direction of the article comprising a portion (A) where the polyolefin resin (a) forms a continuous phase and the resin other than the poly olefin resin (b) forms a continuous or discontinuous phase, a portion (B) where the poly olefin resin (a) forms a discontinuous phase and the resin other than the poly olefin resin (b) forms a continuous phase, and a portion (A) where the poly olefin resin (a) forms a continuous phase and the resin other than the poly olefin resin (b) forms a continuous or discontinuous phase, and the portions are successively observed in order from one surface toward an opposed surface in the thickness direction.

2. The resin-molded article as described in claim 1 wherein contents of the polyolefin resin (a) and the thermoplastic resin other than the polyolefin resin (b) are from 20 to 80 weight percent and from 80 to 20 weight percent, respectively, and the continuous phase of the polyolefin resin (a) and the discontinuous phase of the thermoplastic resin other than the polyolefin resin (b) are observed in an arbitrary depth of from 5 to 10 percent of the entire thickness from the surface, and the continuous phase by the thermoplastic resin other than the polyolefin resin (b) and the discontinuous phase by the polyolefin resin (a) are observed in an arbitrary depth of from 45 to 55 percent of the entire thickness from the surface.

3. The resin-molded article as described in claim 1, wherein the contents of the polyolefin resin (a) and the thermoplastic resin other than the polyolefin resin (b) are from 20 to 80 weight percent and from 80 to 20 weight percent, respectively, and both of the polyolefin resin (a) and the thermoplastic resin other than the polyolefin resin (b) are observed as the continuous phases in an arbitrary depth of from 5 to 10 percent of the entire thickness from the surface, and the continuous phase of the thermoplastic resin other than the polyolefin resin (b) and the discontinuous phase of the polyolefin resin (a) are observed in an arbitrary depth of from 45 to 55 percent of the entire thickness from the surface.

4. The resin-molded article as described in any one of claims 1 to 3, wherein when a higher melting points of the polyolefin resin (a) or that of the thermoplastic resin other than the polyolefin resin (b) is Tp (° C.), at a selected temperature of from Tp+10 (° C.) to Tp+100 (° C.), it is satisfied that a melt viscosity ratio defined by the following formula (1) is 0.5 or less at shear rate of 200 sec$^{-1}$ or less and 0.8 or more at a shear rate of 1000 sec$^{-1}$ or more:

Melt Viscosity Ratio=Melt Viscosity of Thermoplastic Resin other than Polyolefin Resin/Melt Viscosity of Polyolefin Resin  (1).

5. The article as described in any one of claims 1 to 3 wherein the thermoplastic resin other than the polyolefin resin (b) is at least one selected from the group consisting of thermoplastic polyester resin, polyamide resin, and polyphenylene sulfide resin.

6. The article as described in any one of claims 1 to 3 wherein the thermoplastic resin other than the polyolefin resin (b) is a polyamide resin.

7. The article as described in any one of claims 1 to 3 wherein the polyolefin resin (a) is polyethylene.

8. The article as described in any one of claims 1 to 3 wherein the resin-molded article is a vessel for transport or storage of liquid chemicals and/or gases and attached parts thereof.

9. The article as described in any one of claims 1 to 3 which is made by at least one molding method selected from the group consisting of injection molding, injection compression molding, and compression molding.

10. A process for forming the resin-molded article by melt molding a resin composition comprising 20 to 80 weight percent of the polyolefin resin (a) and 80 to 20 weight percent of the thermoplastic resin other than the polyolefin resin (b) wherein the melt viscosity ratio defined by the following formula (1) at a fabricating temperature is 0.5 or less at a shear rate of 200 sec$^{-1}$ or less and 0.8 or more at a shear rate of 1000 sec$^{-1}$ or more:

Melt Viscosity Ratio=

Melt Viscosity of Thermoplastic Resin other than Polyolefin Resin/Melt

Viscosity of Polyolefin Resin  (1).

* * * * *

UNITED STATES PATENT AND TRADEMARK OFFICE
CERTIFICATE OF CORRECTION

PATENT NO. : 6,730,378 B2
DATED : May 4, 2004
INVENTOR(S) : Matsuoka et al.

It is certified that error appears in the above-identified patent and that said Letters Patent is hereby corrected as shown below:

Column 3,
Lines 34 and 35, please change "a-olefins" to -- α-olefins --.

Column 22,
Line 1, please change "Melt Viscosity Ratio=Melt Viscosity of Thermoplastic Resin other than Polyolefin Resin/Melt Viscosity of Polyolefin Resin" to
-- Melt Viscosity Ratio=
(Melt Viscosity of Thermoplastic Resin other than Polyolefin Resin)/(Melt Viscosity of Polyolefin Resin) --; and
Lines 33-36, please change "Melt Viscosity of Thermoplastic Resin other than Polyolefin Resin/Melt Viscosity of Polyolefin Resin" to -- (Melt Viscosity of Thermoplastic Resin other than Polyolefin Resin)/(Melt Viscosity of Polyolefin Resin) --

Signed and Sealed this

Twenty-ninth Day of March, 2005

JON W. DUDAS
*Director of the United States Patent and Trademark Office*